Feb. 5, 1935. J. D. MOONEY 1,989,878
APPARATUS DESIGNED TO ILLUSTRATE THE LAWS
OF ECONOMICS BY PHYSICAL ANALOGIES
Filed Feb. 12, 1934 3 Sheets-Sheet 2
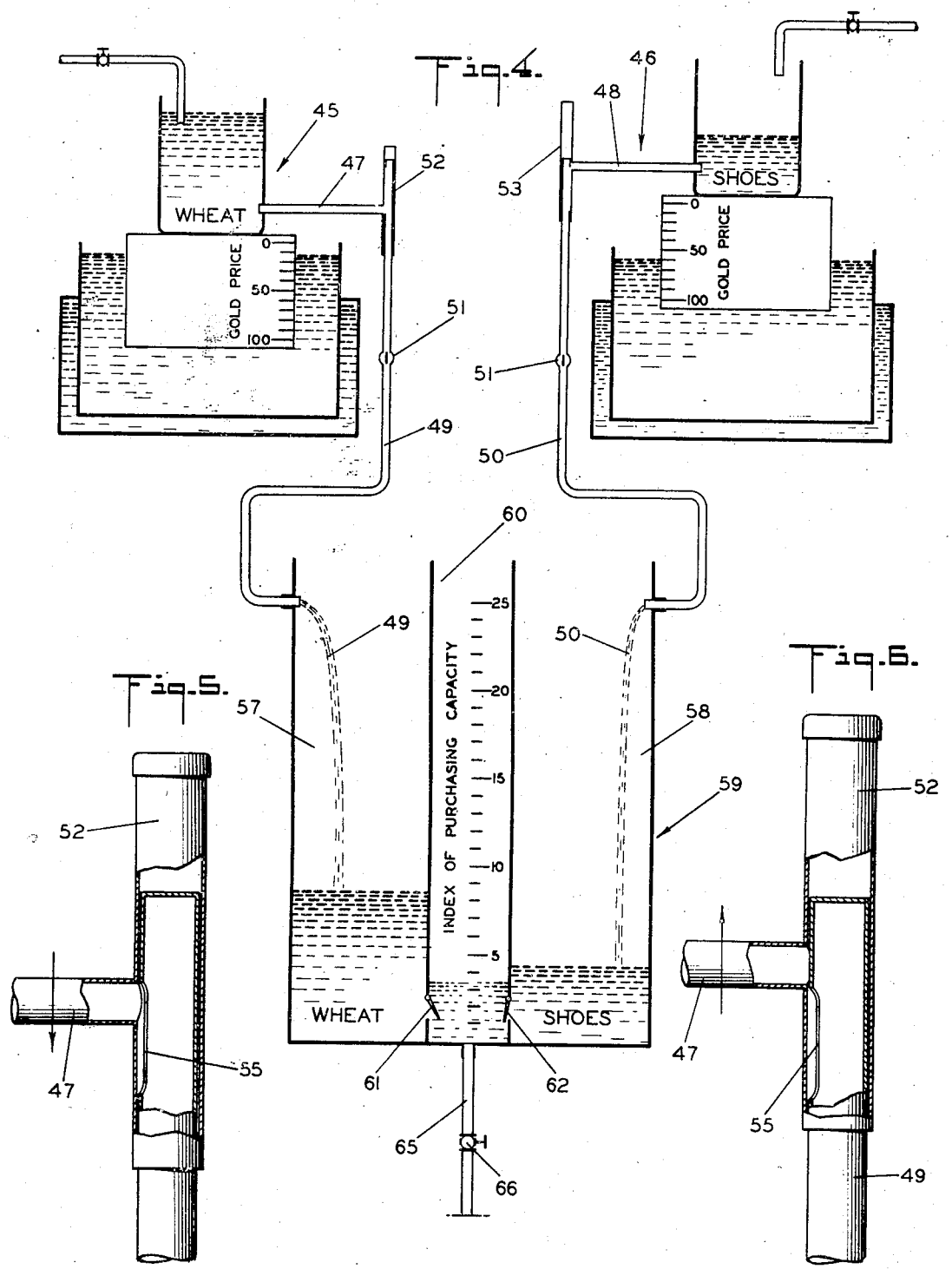
INVENTOR
James D. Mooney
BY
his ATTORNEY Feb. 5, 1935.    J. D. MOONEY    1,989,878
APPARATUS DESIGNED TO ILLUSTRATE THE LAWS
OF ECONOMICS BY PHYSICAL ANALOGIES
Filed Feb. 12, 1934    3 Sheets-Sheet 3
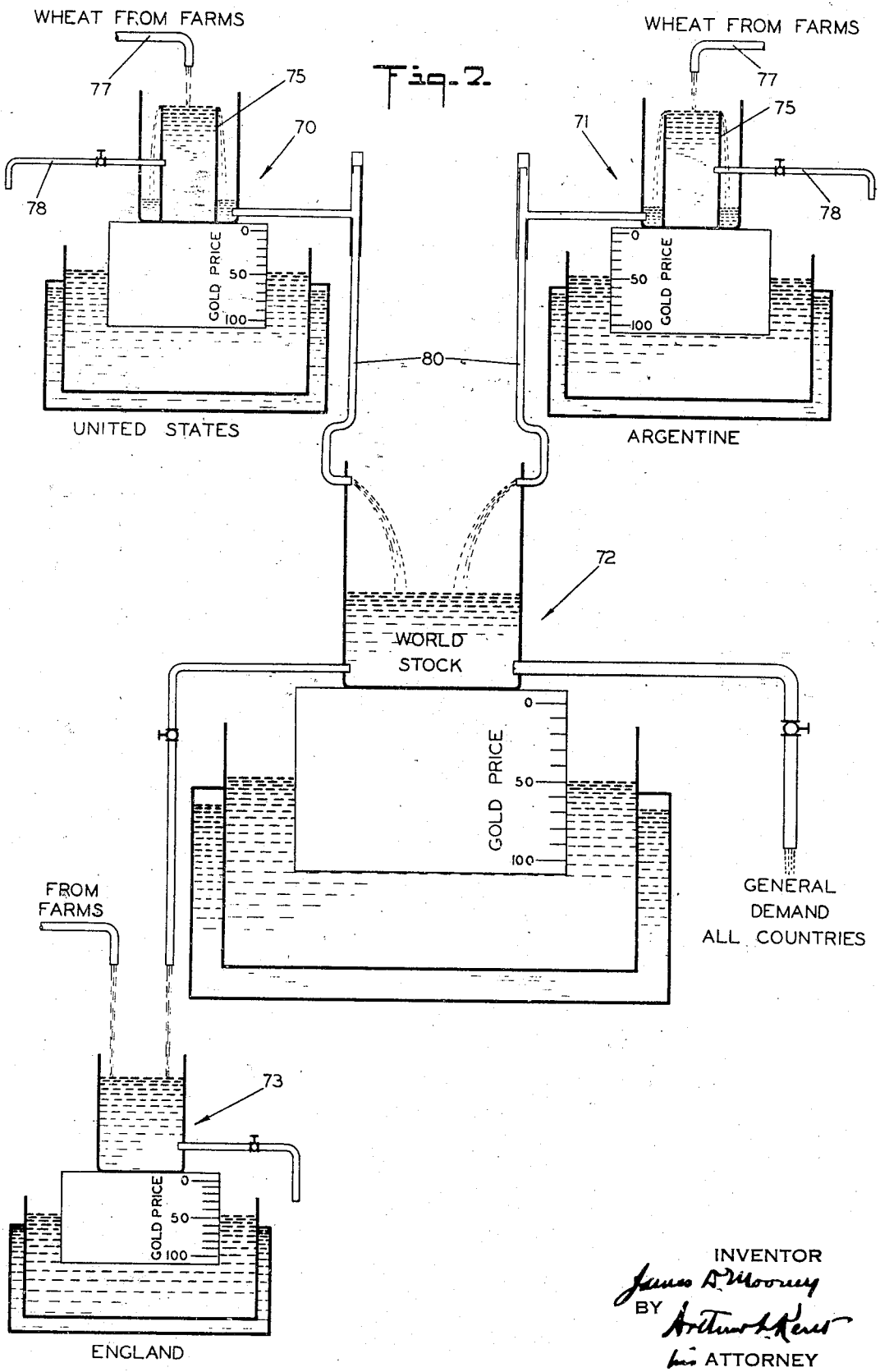

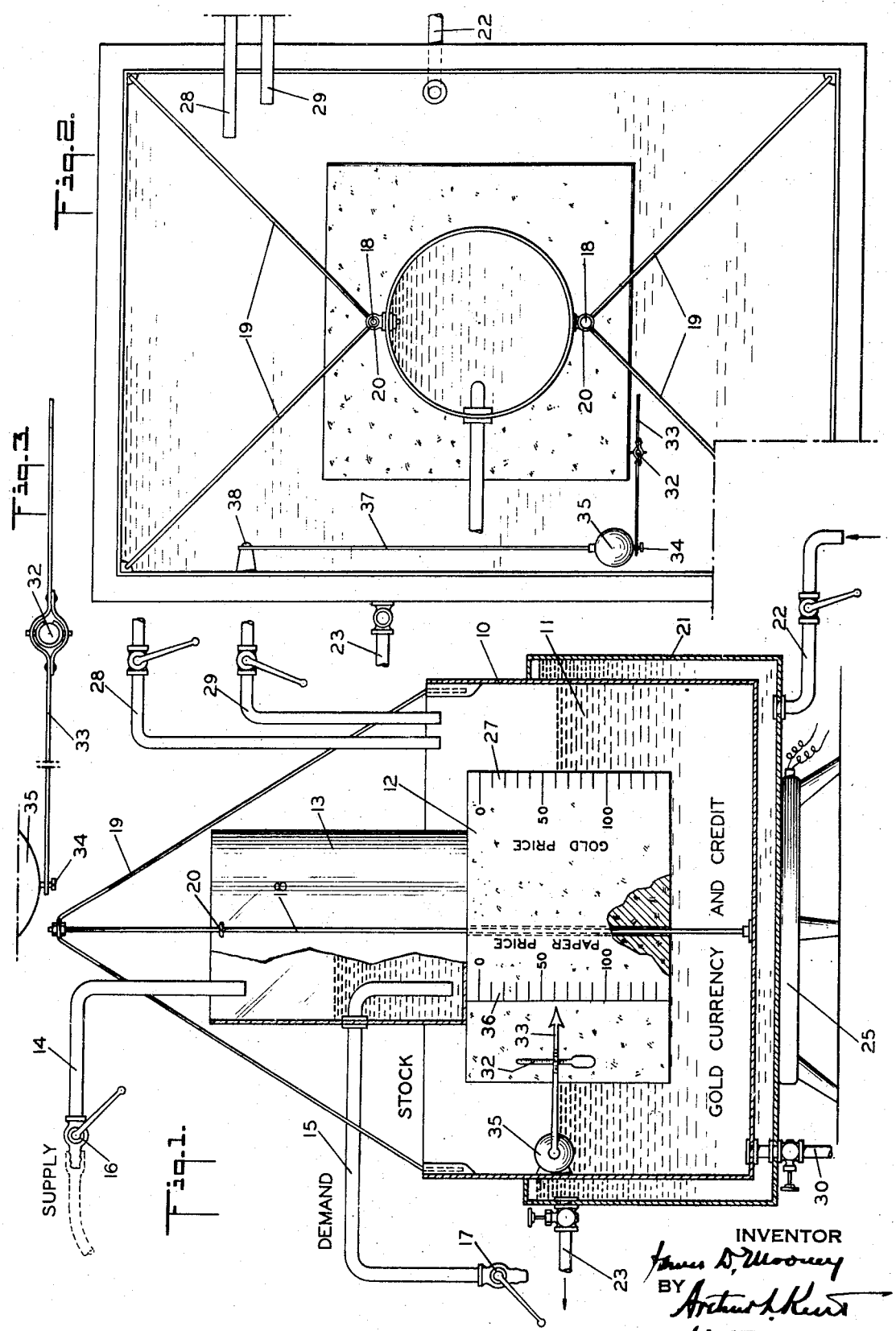

Patented Feb. 5, 1935

1,989,878

UNITED STATES PATENT OFFICE 1,989,878

APPARATUS DESIGNED TO ILLUSTRATE THE LAWS OF ECONOMICS BY PHYSICAL ANALOGIES

James D. Mooney, New York, N. Y.

Application February 12, 1934, Serial No. 710,964

6 Claims. (Cl. 35—24)

This invention relates to apparatus designed to illustrate the laws of economics by physical analogies. Economic laws have heretofore been taught and demonstrated abstractly, aided by tables and charts showing, for example, price variations with time and with other factors.

The object of the present invention is to provide means whereby such laws may be illustrated and taught concretely so that the mind obtains a physical picture to aid what have hitherto been largely, if not entirely, abstract conceptions.

According to the present invention, therefore, apparatus is provided by which physical factors representing supply, demand, the ratio of gold to currency and credit, domestic demand and exportable surplus and the like may be varied to produce physical changes which represent changes in surplus, gold price, paper price, etc.

The laws determining the flow and pressure of liquids are in many respects analogous to the laws of economics, and are, by this invention, utilized in the construction of apparatus for demonstrating economic laws by concrete, visual physical analogies.

Usually, for lack of adequate statistical data with which to calibrate the apparatus the latter will give qualitative rather than strict quantitative relationships.

For any given case for which the statistical data are available, the apparatus may be calibrated, and the various scales will then portray precisely the effect of any and all changes made in one or more of the factors, upon the remaining dependent factors.

In general it can be said that one economic factor at a time may be translated into the physical analogy in such manner as will maintain the integrity of the direction of its force, according to the law of supply and demand. Thus, one can take economic laws, translate them into algebraic expressions, and then express the algebra in a physical analogy.

Then one can draw out the relationships of interest from the physical analogy into algebraic expressions, and translate these expressions into economic terms and patterns.

Suitable forms of apparatus embodying the present invention are shown, by way of example, in the accompanying drawings, in which:

Fig. 1 is a side elevation partly in section of an apparatus embodying the principal features of the present invention for illustrating the factors influencing the price of a commodity;

Fig. 2 is a plan view of the same;

Fig. 3 is a detail plan view on an enlarged scale of the hydrometer and its associated parts;

Fig. 4 is a diagrammatic view of an apparatus for illustrating the relative flow to market of a plurality of commodities;

Fig. 5 is a detail elevation on an enlarged scale, partly in section, on one of the slide-valves of the apparatus shown in Fig. 4;

Fig. 6 is a view similar to Fig. 5 showing the slide-valve in closed position; and Fig. 7 is a diagrammatic view of an apparatus for illustrating the law of supply and demand as it relates to world markets.

The apparatus shown in Figs. 1 to 3 comprises a rectangular tank 10 containing liquid 11 and a float 12 supported by such liquid. On top of the float is a jar 13, preferably of glass or other transparent material, adapted to receive liquid through a pipe 14 from any convenient source, not shown, and to discharge liquid therefrom through a pipe 15. Flow of liquid through the pipe 14 represents the supply of any given commodity and flow of liquid through the pipe 15 represents the demand for such commodity. Valves 16 and 17 are provided to enable the flow of liquid through the pipes 14 and 15 respectively to be regulated so as to simulate changes in supply and demand. The float and jar are kept in vertical position by means of a pair of guide rods 18 having their lower ends secured to the bottom of the tank 10 and having their upper ends held in position by braces 19 extending to the four corners of the tank. These braces pass through holes in the float and rings 20 secured to upper end of the jar 13.

If liquid is supplied to the jar 13 faster than it can flow out through the pipe 15, the level of the liquid within the jar will rise, thereby simulating the building up of a stock whenever the supply exceeds the demand.

The building up of a stock of the commodity depresses the price and thereby stimulates demand. To enable the apparatus to illustrate this economic law, the float is provided at 27 with a vertical scale representing the gold price of the commodity. This scale is arranged so that, as the depth to which the float is submerged in the liquid 11 increases, due to increasing weight of liquid in the jar, the scale indicates a correspondingly decreasing gold price. As the weight of liquid in the jar increases, the hydrostatic head which regulates the rate of flow through the pipe 15 increases and thereby increases the rate of flow therethrough (demand).

The fundamental inventive idea embodied in the apparatus shown is that an increase of liquid pressure in the jar (increase in stock or an excess of productive capacity over demand) simultaneously increases the submergence of the float (decrease in gold price) and also the rate of discharge through the pipe 15 (increase in demand).

The price of a commodity is often quoted in terms of paper, silver or currency other than gold. A commodity may, therefore, have two prices, a paper (or silver, etc.) price and a gold price. These two prices may be substantially equal, as in the case in a country on the gold standard and possessing adequate gold reserves with respect to paper currency and credit. If, however, either the gold reserves decrease, owing to hoarding, transfer of gold to other countries, etc., or the paper currency and credit increase unduly for any reason, the paper price tends to rise and the gold price tends to fall. At the same time, both the paper and gold prices will vary with changes in supply and demand. The depth of submergence of the float will indicate the resultant or algebraic sum of the effect of changes in the quantity of liquid in the jar 13 and in the specific gravity of the liquid 11. An indicator giving merely the specific gravity of the liquid 11 will not give an accurate representation of paper price as such indicator, being independent of the submergence of the float, would indicate that the paper price was independent of variations in supply and demand and that when the demand was very low the paper price might be in excess of the gold price. The paper price will always be equal to or higher than the gold price and will rise and fall with the latter according to the law of supply and demand, if gold reserves are ample.

To enable these economic principles to be illustrated, a pointer is provided arranged to move downwardly over a scale on the float as the specific gravity of the liquid 11 decreases and vice versa. The position of the pointer is the resultant of changes in a specific gravity and in the corresponding degree of submergence of the float.

One convenient method of changing the specific gravity of the liquid 11 is to use water as the liquid and vary its specific gravity by adjusting the amount of a highly soluble salt dissolved therein. Potassium nitrate is very suitable for this purpose as it has a wide range of solubility with variations in temperature, as shown by the following table:

| Temperature | Grams KNO₃ per 100 grams of water | Specific gravity |
|---|---|---|
| Degrees centigrade | | |
| 0 | 13.3 | 1.082 |
| 15 | 25.8 | 1.139 |
| 30 | 45.8 | 1.222 |
| 45 | 74.5 | 1.304 |
| 60 | 110.0 | 1.390 |
| 90 | 202.0 | 1.530 |

The specific gravity of the potassium nitrate solution can be increased by simultaneously warming it and adding either solid potassium nitrate or a hot concentrated solution thereof. The specific gravity can be lowered either by cooling the solution to precipitate out a part of the salt or by adding water.

To enable the tank 10 which contains the potassium nitrate solution to be heated or cooled as desired, it is provided with a jacket 21 having pipes 22 and 23 for admitting and discharging heating or cooling fluids, such as steam or water. Where hot water or steam are not available for heating, an electric hot-plate 25 may be used, as shown.

Pipes 28 and 29 are provided for enabling water and concentrated salt solution to be added to the tank 10 as desired. To enable the solution in the tank to be withdrawn either partially or wholly a pipe 30 is provided.

For the purpose of indicating on a scale on the float the resultant of variations in specific gravity and in the degree of submergence of the float, a hydrometer 32 is provided. This hydrometer is pivotally connected to the central portion of a pointer 33 having one end pivotally supported at 34 by a float 35. The free end of the pointer moves up and down along a scale 36 on the float as the hydrometer moves up and down with variations in the specific gravity of the liquid 11. The float is mounted on the end of a long arm 37 pivotally mounted on the inner wall of the tank at 38.

The hydrometer is connected to the pointer by a split sleeve permitting the position of the pointer to be adjusted so that for the maximum specific gravity desired for the demonstration the end of the pointer opposite the scale will be at the same height as the level of the solution 11, thereby indicating parity of paper and gold prices. Conveniently, the apparatus is normally operated at 30° C. at which temperature the maximum specific gravity (using potassium nitrate) will be 1.222.

If the solution 11 is cooled to 15° C., the specific gravity will drop to 1.139. As a result, both the float and the hydrometer will sink in the solution. By reason of the fact that one end of the pointer is always at the liquid surface, the opposite end of the pointer will always show a higher paper than gold price whenever the specific gravity drops below normal. The apparatus may be so constructed that such rise in the paper price is either greater or less than the fall in the gold price. To advantage the apparatus is constructed so that the former is true, in which case the pointer will indicate a rise in paper price at the same time that the sinking of the float indicates a fall in the gold price. This result is obtained by the use of a long hydrometer and/or by connecting the latter to the pointer so as to obtain a multiplying effect.

The apparatus shown in Figs. 1 to 3 is capable of showing the variation in gold price of a single commodity with variations in supply and demand and in paper price with changes not only in supply and demand but also in the ratio of gold to currency and credit. The economic situation of a country is, however, the sum of the relationship of supply and demand for a wide number of commodities and of supply and demand for any given commodity in the various countries of the world.

An apparatus capable of showing the relationships of supply and demand for a plurality of commodities, for example wheat and shoes, is shown in Figs. 4 to 6. This apparatus includes two tank and float units 45 and 46 constructed similarly to the unit shown in Figs. 1 to 3, except that the demand pipes 47 and 48 which rise and fall with the floats are provided with slide valves for controlling the discharge of liquid therethrough into the fixed pipes 49 and 50.

The construction of these slide valves is shown more particularly in Figs. 5 and 6. One half of each valve consists of a T-piece 52 or 53 secured to the end of the corresponding pipe 47 or 48. These T-pieces are closed at the upper end and have a bore of the same diameter as the upper ends of the pipes 49 and 50, which are slidingly arranged therein. The pipes 49 and 50 are closed at their upper ends and are each provided with a slot 55 along one side adapted to register with the bores of the pipes 47 and 48. The slots 55 are to advantage tapered but may be of equal width throughout their length or of any other desired configuration.

It will be noted that as the float rises the portion of the slot 55 in register with the bore of the corresponding demand pipes becomes progressively narrower so as increasingly to restrict flow therethrough to simulate the falling off of demand with increasing price.

The pipes 49 and 50 discharge into two compartments 57 and 58 of a vessel designated generally as 59. Between these two compartments 57 and 58 is a third compartment 60 arranged to receive liquid from the outer compartments through non-return valves 61 and 62. Liquid is discharged from the central compartment 60 through a pipe 65. This pipe may be provided with a valve 66 for permanent adjustment of the flow. Flow through the pipe 65 represents the total consumer demand for both commodities.

As the flow through the non-return valves 61 and 62 varies directly with the differences in level, it follows that a rise in level in the compartment 57 increases the flow into the compartment 60 and thence to the consumer. If the flow into 60 is sufficient to create a high level in 60, the tendency is to decrease the flow from 58 unless the level therein also rises. Thus the flow of low priced goods (wheat) tends to shut off the flow of high priced goods (shoes).

This apparatus can also be used to show the operation of international trade. Valves 51 have therefore been introduced to demonstrate the restrictive effects of tariffs.

The form of apparatus shown in Fig. 7 is designed more particularly to show the relationship between domestic supply and demand, exportable surplus and world supply and demand for any given commodity, like wheat. In this case, four float and tank units 70, 71, 72 and 73 are used. The units 70 and 71 represent supply and demand relationships for countries having an exportable surplus, for example, United States and the Argentine in the case of wheat. The unit 72 represents the combined supply and demand of all countries in the world having a domestic supply below the domestic demand and hence requiring importation of a part of the exportable surplus from the other countries. The unit 73 represents the relationship between supply and demand for one of the countries, say England, having a domestic supply below the domestic demand.

The tank and float units 70 and 71 differ from that shown in Figs. 1 to 3 by the fact that the floats of the units 70 and 71 are provided with double instead of single glass jars for receiving the supply. The floats 70 and 71 are of identical construction and are calibrated to give equal readings under equal conditions. The inner jars 75 receive liquid representing the domestic supply through the pipes 77 and discharge liquid representing the domestic demand through the pipes 78. The outer jars 76 receive the overflow (exportable surplus) from the inner jars 75 and discharge such overflow through pipes 80 into the jar of the unit 72.

It will be understood that the apparatus illustrated and described are purely illustrative of the various forms of apparatus which may be employed for the purpose of giving a physical picture of the operation of economic laws. Thus, the scales shown may be modified. Also, the operation of the apparatus may be made automatic so as to illustrate an entire business cycle of over-expansion, collapse and recovery back again to a condition of over-expansion. It will also be understood that the apparatus may be employed for the making of educational films which will then be used in place of the apparatus itself to give visual illustrations of the operation of economic laws.

What is claimed is:

1. A device for illustrating economic laws, comprising a tank containing liquid, a float therein, a liquid receptacle carried by said float, means for admitting liquid to and means for discharging liquid from such receptacle simultaneously to represent commodity supply and demand, and means for regulating the flow of liquid through one of said means to vary the downward pressure of the liquid in said receptacle on said float, the depth to which the float is submerged representing changes in commodity price with changes in supply and demand.

2. A device for illustrating economic laws, comprising a tank containing liquid, means for varying the specific gravity of such liquid to represent changes in the ratio between gold and currency and credit, a float in said tank adapted to represent by changes in depth of submergence due to changes in specific gravity of the liquid variations in commodity price resulting from a change in the ratio between gold and currency and credit.

3. A device for illustrating economic laws, comprising a tank containing a liquid representing currency and credit and a material soluble therein representing gold, a float in the tank, the depth to which the float is submerged representing commodity price in gold, and means for varying the temperature of the tank to vary the amount of such material dissolved in the liquid and thereby the specific gravity of the solution to produce variations in the depth of submergence of the float (gold price) with variations in the ratio between the solute (gold) and the solvent (currency and credit).

4. A device for illustrating economic laws, comprising a tank containing liquid, means for varying the specific gravity of such liquid to represent changes in the ratio between gold and currency and credit, a float in said tank, a liquid receptacle carried by said float, means for admitting liquid to and means for discharging liquid from said receptacle simultaneously to represent commodity supply and demand, and means for regulating the flow of liquid through one of said means to vary the flow of liquid through one of said means, whereby the depth to which the float is submerged varies with the algebraic sum of the variations in the specific gravity of the liquid in the tank and of the variations in the downward pressure of the liquid in said receptacle to represent changes in commodity price with the gold ratio and supply and demand.

5. A device for illustrating economic laws, comprising a tank containing liquid, a float therein, the depth to which the float is submerged representing commodity prices, a liquid receptacle carried by said float, a pipe for supplying liquid to said receptacle to represent commodity supply, a pipe for discharging liquid therefrom to represent commodity demand, a valve in the last mentioned pipe operated by vertical movements of said float and receptacle within said tank to produce variations in discharge (demand) with variations in depth of submergence of the float (price).

6. A device for illustrating economic laws, comprising a plurality of liquid tanks, means for supplying liquid to said tanks at variable rates to represent flow of commodities to market, a receptacle adapted to receive liquid from all of said tanks, a discharge conduit from said receptacle, said conduit having a restricted cross-section to cause the liquid in said receptacle to back up to a height proportional to the rate of flow through the said discharge conduit to indicate the total rate of flow of commodities to market.

JAMES D. MOONEY.